United States Patent
Yi et al.

(10) Patent No.: US 9,509,669 B2
(45) Date of Patent: Nov. 29, 2016

(54) EFFICIENT ROUTING OF STREAMS ENCRYPTED USING POINT-TO-POINT AUTHENTICATION PROTOCOL

(71) Applicant: Lattice Semiconductor Corporation, Portland, OR (US)

(72) Inventors: Ju Hwan Yi, Sunnyvale, CA (US); Wooseung Yang, San Jose, CA (US); Hoon Choi, Mountain View, CA (US)

(73) Assignee: Lattice Semiconductor Corporation, Portland, OR (US)

( * ) Notice: Subject to any disclaimer, the term of this patent is extended or adjusted under 35 U.S.C. 154(b) by 0 days.

(21) Appl. No.: 14/610,855

(22) Filed: Jan. 30, 2015

(65) Prior Publication Data

US 2015/0295903 A1 Oct. 15, 2015

Related U.S. Application Data

(60) Provisional application No. 61/979,477, filed on Apr. 14, 2014.

(51) Int. Cl.
*H04L 29/06* (2006.01)
*H04L 9/08* (2006.01)
*H04L 9/32* (2006.01)

(52) U.S. Cl.
CPC ......... *H04L 63/0457* (2013.01); *H04L 9/0819* (2013.01); *H04L 9/0822* (2013.01); *H04L 9/3263* (2013.01); *H04L 63/08* (2013.01)

(58) Field of Classification Search
CPC ........... H04L 63/0428; H04L 63/0435; H04L 63/0457; H04L 63/08; H04L 63/0823; H04L 67/28; H04L 9/0819; H04L 9/0822; H04L 9/3263

USPC .......................................................... 713/153
See application file for complete search history.

(56) References Cited

U.S. PATENT DOCUMENTS

| | | |
|---|---|---|
| 2010/0042834 A1 | 2/2010 | Moret et al. |
| 2012/0159159 A1* | 6/2012 | Messerges ............. H04L 9/321 713/168 |
| 2013/0315393 A1 | 11/2013 | Wang et al. |
| 2013/0340046 A1 | 12/2013 | Yu et al. |

OTHER PUBLICATIONS

"High-Bandwidth Digital Content Protection System" HDCP 2.2 on HDMI Specification, Digital Content Protection LLC, Feb. 13, 2013.*
PCT International Search Report and Written Opinion, PCT Application No. PCT/US2015/022309, Jul. 9, 2015, 11 pages.
"High-Bandwidth Digital Content Protection System," HDCP 2.2 on HDMI Specification, Digital Content Protection LLC, Feb. 13, 2013, pp. 1-72.

* cited by examiner

*Primary Examiner* — Yogesh Paliwal
(74) *Attorney, Agent, or Firm* — Fenwick & West LLP

(57) ABSTRACT

Embodiments relate to routing encrypted data from a source to a sink via a router without decrypting the data in the router. The source authenticates with the router, the result of which produces a session key and a pseudo-random number. The router authenticates with the sink using the same session key and pseudo-random number. The router passes encrypted data received from the source to the sink without decryption and re-encryption.

20 Claims, 5 Drawing Sheets

EFFICIENT ROUTING OF STREAMS ENCRYPTED USING POINT-TO-POINT AUTHENTICATION PROTOCOL

This application claims priority from U.S. Provisional Patent Application No. 61/979,477, entitled "MHL3 Router without HDCP2.2 Decryption and Encryption Operation" filed on Apr. 14, 2014, the contents of which are incorporated by reference herein in their entirety.

BACKGROUND

1. Field of the Disclosure

This disclosure pertains in general to data communications, and more specifically to routing of encrypted streams between a media source and a media sink through a router.

2. Description of the Related Art

High-bandwidth Digital Content Protection (HDCP) is a specification designed to protect digital content across various interfaces. A typical HDCP configuration includes an HDCP data source device (i.e., DVD player, HD DVD player, Blu-Ray player, computer video cards, etc.), an HDCP Repeater (i.e., receiver), and one or more HDCP data sink devices (i.e., television, monitor, etc.). Encrypted data streams are transmitted from the HDCP source device to the HDCP sink devices via the HDCP Repeater. Before transmitting the data streams, the source device authenticates with the repeater device, and the repeater device authenticates with the downstream sink devices.

As one example application, HDCP is used to encrypt data streams. An HDCP version 2.2 (HDCP2.2) repeater can route HDCP2.2 encrypted streams from the data source to the data sink, but it does so by decrypting the incoming encrypted streams and then re-encrypting the streams for downstream delivery. HDCP2.2 decryption and encryption are expensive functions to implement due to the number of Advanced Encryption Standard (AES) engines.

SUMMARY

Embodiments relate to routing encrypted data from a source device to a sink device via a router without decrypting the data in the router. The source device authenticates with the router at a first port of the router by performing a point-to-point authentication. After successful authentication, the router receives a session key and a pseudo-random number from the source device. The router then authenticates with a first sink device at a second port. After the router successfully authenticates with the first sink device, the router sends to the first sink device the same session key and pseudo-random number it received from the source device. The router receives a first encrypted stream from the source device at the first port. The router then routes the encrypted stream from the first port to the second port without decrypting and re-encrypting the data. The router then sends the encrypted stream from the second port to the first sink device.

In one embodiment, the router receives from the source a second encrypted stream, the second stream also encrypted using the same session key and the same pseudo random number as the first encrypted stream. The router routes the second data stream from the first port to a third port and then sends the second encrypted data from the third port to a second sink device.

In one embodiment, the router demultiplexes a multiplexed stream including the first and second encrypted streams into two separate encrypted streams.

In one embodiment, the authentication protocol comprises the router receiving an authentication invitation from the source device. The router then sends an acknowledgment of the invitation to the source device, the acknowledgment including downstream sink capabilities. The router then receives an acknowledgment and uses the information in the acknowledgment to compute a verification value (H'). The router sends the verification value (H') to the source device along with pairing information.

In one embodiment, the authentication protocol comprises High-bandwidth Digital Content Protection (HDCP).

In one embodiment, the source and the router are connected via a wired communication network.

In one embodiment, the wired communication network uses a High-Definition Multimedia Interface (HDMI) or Mobile High-Definition Link (MHL) protocol.

BRIEF DESCRIPTION OF THE DRAWINGS

The teachings of the embodiments disclosed herein can be readily understood by considering the following detailed description in conjunction with the accompanying drawings.

DETAILED DESCRIPTION

The Figures (FIG.) and the following description relate to various embodiments by way of illustration only. It should be noted that from the following discussion, alternative embodiments of the structures and methods disclosed herein will be readily recognized as viable alternatives that may be employed without departing from the principles discussed herein. Reference will now be made in detail to several embodiments, examples of which are illustrated in the accompanying figures.

Embodiments relate to routing encrypted data from a source to a sink via a router without decrypting the data in the router. The source authenticates with the router, and after successful authentication, the router receives a session key and a pseudo-random number from the source. The router authenticates with the sink, and after successful authentication the router sends the same session key and pseudo-random number to the sink. The router passes encrypted data received from the source to the sink without decryption and re-encryption.

Point-to-point authentication described herein refers to authentication of a connection between two nodes. Examples of nodes include DVD players, HD DVD players, set top boxes, game consoles, televisions, displays, projectors, switches, etc. Protocols for performing point-to-point authentication schemes include, among others, High-bandwidth Digital Content Protection (HDCP).

Demultiplexing described herein refers to a process of splitting up a single stream into a plurality of streams.

The following embodiments are described primarily using High-bandwidth Digital Content Protection (HDCP) 2.2 in the context of Mobile High-Definition Link (MHL) as an example. However, other authentication schemes and media transmission schemes may also use the principles of the disclosure described herein.

Figure 1:
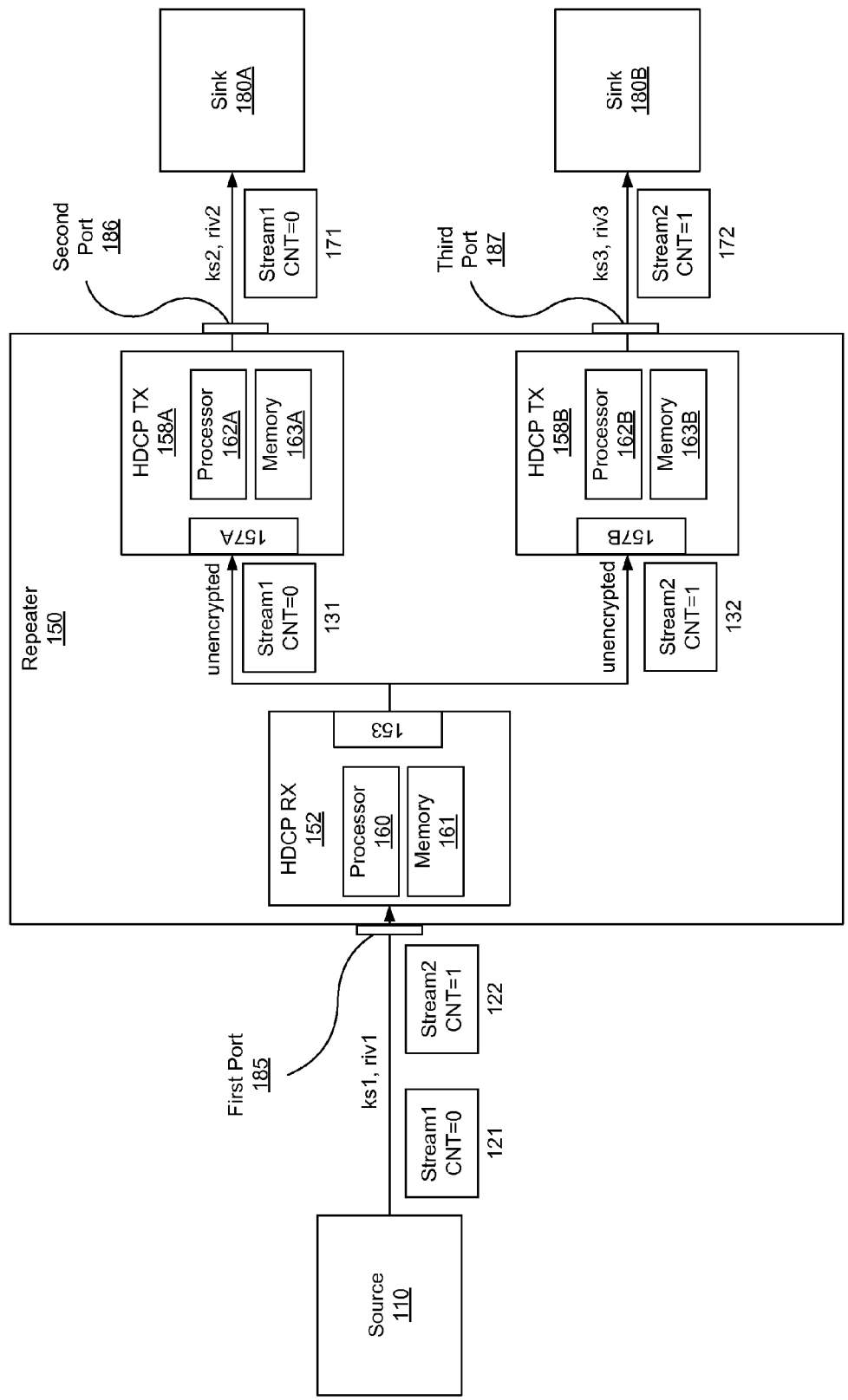
FIG. 1 is a block diagram illustrating a system including a repeater for routing encrypted streams from a source to sinks, according to one example.

FIG. 1 is a block diagram illustrating a system including a source 110, sinks 180A, 180B and a repeater 150 for routing encrypted streams, according to one example. Examples of source 110 include DVD players, HD DVD players, Blu-Ray players, and computer video cards. Examples of sink 180 include televisions, monitors, and displays. In FIG. 1, source 110 initiates a point-to-point authentication process, for example, according to the HDCP 2.2 standard with repeater 150 at first port 185. After successfully authenticating repeater 150 with source 110, repeater 150 receives at first port 185 a session key ks1 and a pseudo-random number riv1 from source 110. For convenience, session key ks1 and pseudo-random number riv1 are collectively referred to as "first encryption data" herein.

After repeater 150 receives session key ks1 and pseudo-random number riv1, source 110 sends encrypted contents streams 121 and 122 to the repeater 150 at first port 185. The HDCP receiver (RX) engine 152 in repeater 150 includes decipher engine 153. Decipher engine 153 uses the first encryption data (ks1 and riv1) to decrypt the encrypted contents and recover unencrypted streams 131 and 132.

Separate from the authentication of repeater 150 with source 110, repeater 150 performs authentication of sinks 180A and 180B at second port 186 and third port 187, respectively. Specifically, the downstream port 157A of the repeater 150 performs the authentication process with sink 180A via second port 186 and the downstream port 157B performs another authentication process with sink 180B via third port 187. The two authentication processes use different encryption data. Like in the upstream handshake, HDCP transmitter (TX) engine 158A and corresponding sink 180A share second encryption data (i.e., session key ks2 and pseudo-random number riv2), and HDCP TX engine 158B and corresponding sink 180B share third encryption data (i.e., session key ks3 and pseudo-random number riv3). HDCP TX engine 158A includes a cipher engine 157A, which uses the second encryption data ks2 and riv2 to encrypt stream 171. Similarly, HDCP TX engine 158B includes cipher engine 157B to encrypt stream 172. Sink 180A uses second encryption data (i.e., ks2 and riv2) to decrypt encrypted stream 171. Similarly, sink 180B uses third encryption data (i.e., ks3 and riv3) to decrypt encrypted streams 172.

The authentication process described herein comprises of a series of processes. Source 110 authenticate with repeater 150. After successful authentication between source 110 and repeater 150, source 110 sends a first session key ks1 and a first pseudo-random number riv1 to repeater 150. Separately from the authentication between source 110 and repeater 150, repeater 150 authenticates with sink 180A. After successful authentication between repeater 150 and sink 180A, repeater 150 sends a second session key ks2 and a second pseudo-random number riv2 to sink 180A. Since the authentication between source 110 and repeater 150 and repeater 150 and sink 180A occur separately, the authentications use different session keys ks1 and ks2 and pseudo-random numbers riv1 and riv2.

In one embodiment, the authentication process at repeater 150 begins with repeater 150 receiving an authentication initiation message from source 110, the authentication initiation message containing a first pseudo-random value (rtx) and source 110 capability (TxCaps) parameters. Source 110 capability parameters include any restrictions source 110 may have. Repeater 150 sends an acknowledgment send certificate (AKE Send Cert) message to source 110, the acknowledgment send certificate (AKE Send Cert) message containing a receiver certificate (certrx), a second pseudo-random number (rrx), and sink 180A capability (RxCaps) parameters. Sink 180A capability parameters include any restrictions sink 180A may have. Router 150 receives a store acknowledgement (AKE No Stored km) that no master key is stored from source 110, the store acknowledgment containing a master key encrypted with a receiver public key (Ekpub(km)). Router 150 computes a verification value (H') based at least on the first pseudo-random value (rtx), sink 180A capability parameters (RxCaps), source 110 capabilities parameters (TxCaps) and a derived key (kd). Router 150 sends a verification value (H') acknowledgement message (AKE Send H_prime) to source 110. Router 150 sends pairing information to source 110, the pairing information generated by encrypting the master key (km) with an internal secret key (kh) (E_kh(km)).

One disadvantage to the example of FIG. 1 is that additional decryption (by decipher engine 153) and encryptions (by cipher engines 157A, 157B) are performed at repeater 150. Such decryption and encryption are useful if some manipulation on the contents (e.g., color space conversion and insertion of auxiliary information) is to be performed at repeater 150. However, if the encrypted stream is only being routed without further manipulation at repeater 150, the additional decryption and encryption at repeater 150 become redundant tasks. To perform decryption and encryption, repeater 150 includes multiple Advanced Encryption Standard (AES) engines taking up a large space and other resources in repeater 150.

Figure 2:
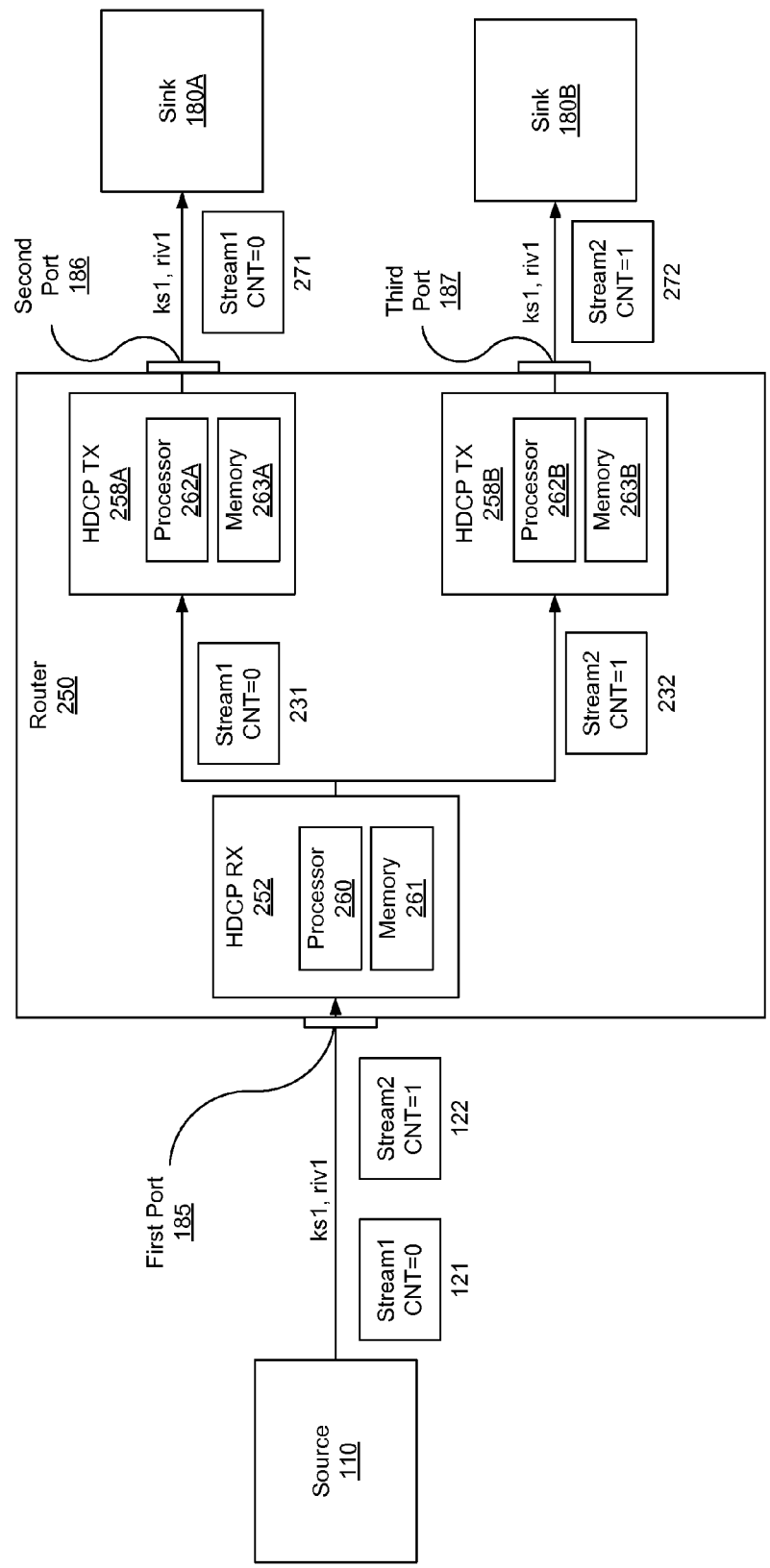
FIG. 2 is a block diagram of a system including a router for routing encrypted streams without performing decryption and re-encryption in the router, according to one embodiment.

FIG. 2 is a block diagram of a system including router 250 for routing encrypted streams without performing decryption and re-encryption in router 250, according to one embodiment. The system of FIG. 2 is substantially identical to the system of FIG. 1 except that the same encryption data is used between source 110, router 250, and sinks 180A, 180B. That is, the encryption data (i.e., session key ks1 and pseudo-random number riv1) used between source 110 and router 250 is also used between the router 250 and the sinks 180A, 180B. Router 250 may be embodied as a repeater as defined in HDCP standards.

According to HDCP 2.2 standard, the encryption data is determined by the HDCP transmitter (TX) engine. That is, source 110 initiates a point-to-point authentication with router 250 at first port 185, more specifically at HDCP receiver (RX) engine 252. The authentication process between source 110 and router 250 of FIG. 2 is identical to the authentication process between the source 110 and repeater 150 described above in detail with reference to FIG. 1.

After authentication between source 110 and HDCP RX engine 252, RX engine 252 receives a session key ks1 and a pseudo-random number riv1 from source 110. RX engine 252 forwards the session key ks1 and pseudo-random number riv1 to TX engines 258A and 258B. After receiving the session key ks1 and pseudo-random number riv1, TX engine 258A authenticates with sink 180A via second port 186 and TX engine 258B authenticates with sinks 180B via third port 187. The authentication process between router 250 and sinks 180A, 180B of FIG. 2 are substantially the same as the authentication process between repeater 150 and sinks 180A, 180B as described above with reference to FIG. 1.

After authenticating with sinks 180A, 180B, TX engines 258A and 258B send the same encryption data (i.e., session key ks1, pseudo-random number riv1) rather than different encryption data (i.e. session key ks2, pseudo-random number riv2 and session key ks3, pseudo random number riv3) to sinks 180A and 180B. Sinks 180A, 180B use the same encryption data as the source 110. In this way, the encrypted streams 121,122 from source 110 stay encrypted within router 250 as streams 231, 231 without being decrypted and re-encrypted at router 250. Router 250 can send these streams 231, 232 (as streams 271, 272) to sinks 180A, 180B for decryption.

If there are multiple streams, typically a different stream cipher (i.e., different encryption data) will be used for each stream. In one approach for multi-stream cases, stream count indicator, StreamCounter (denoted CNT in FIGS. 1 and 2), is also embedded or otherwise transmitted for each stream because StreamCounter is another piece of information used by RX engine 252 to perform the decryption, as described below in detail with reference to FIG. 3. For example, in FIG. 2, assume that original streams 121 and 122 have StreamCounter=0 and StreamCounter=1, respectively. StreamCounters are propagated through router 250, such that each stream reaches the respective sinks 180 with the same StreamCounter values for each stream. That is, stream 271 still has StreamCounter=0 and stream 272 still has StreamCounter=1. In this scheme, to meet the HDCP 2.2 standard, the receiver identification (RX ID) list propagation can be performed in the same way as for the HDCP repeater 150 of FIG. 1.

Figure 3:
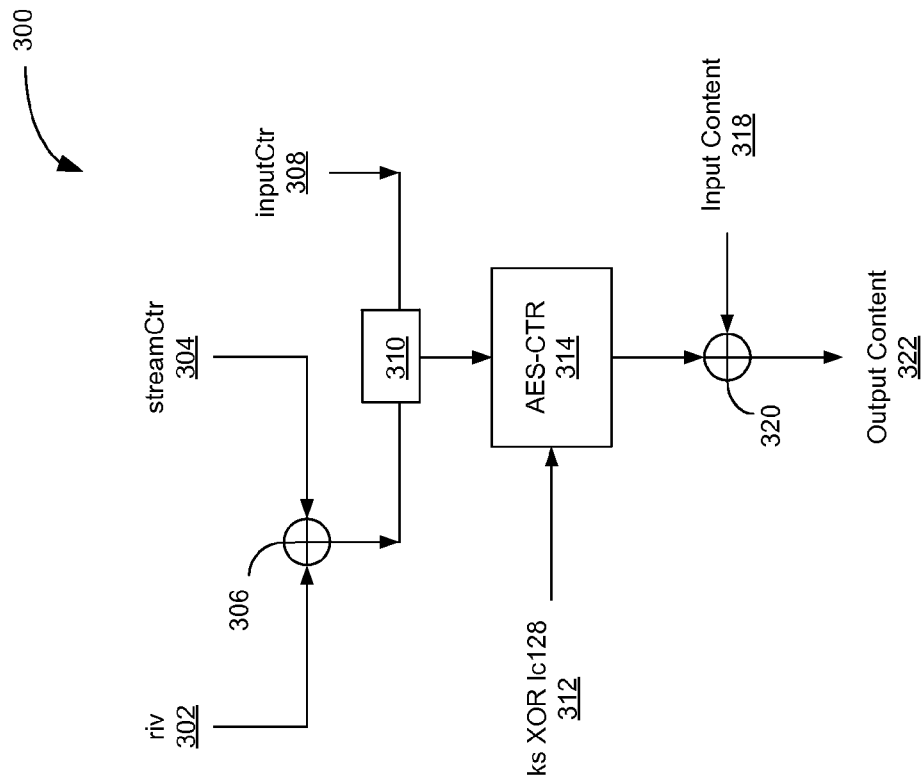
FIG. 3 is a schematic diagram showing a cipher structure used in an authentication protocol, according to one embodiment.

FIG. 3 is a schematic diagram of a cipher structure 300 used to encrypt or decrypt data stream transmitted between source 110 and router 250, and router 250 and sinks 180A, 180B, according to one embodiment. A pseudo-random number riv 302 is exclusive-or-ed (XORed) at XOR module 306 with the value in a counter streamCtr 304. The output of XOR module 306 is concatenated at concatenation module 310 with the value in a counter inputCtr 308.

The counter inputCtr 308 value is determined by concatenating the frame number with the data number (not shown in the figure). The frame number represents the number of encrypted frames since the start of the encryption process and the data number represents the number of times the bit block of the key stream has been generated. The session key ks is XORed with the secret global constant, lc128. The processing at concatenation module 310 and the XOR 312 of ks and lc128 are input to an AES module operating in a counter mode 314 (AES-CTR). AES-CTR 314 outputs a key stream which is XORed with the input content 318 at XOR module 320 to produce output content 322.

Source 110 of FIG. 2 includes cipher structure 300 to generate encrypted streams 121, 122. For this purpose, input content 318 in source 110 is unencrypted version of the streams whereas output content 322 is the encrypted signals 121, 122. Sinks 180A, 180B of FIG. 2 include the same cipher structure 300 for the purpose of decrypting the encrypted streams 271, 272. For this purpose, input content 318 in sink 180A is encrypted stream 271 while input content 318 in sink 180B is encrypted stream 272. Output content 322 from cipher structure 300 in the sinks 180A, 180B are decrypted versions of the streams 271, 272, respectively.

Figure 4:
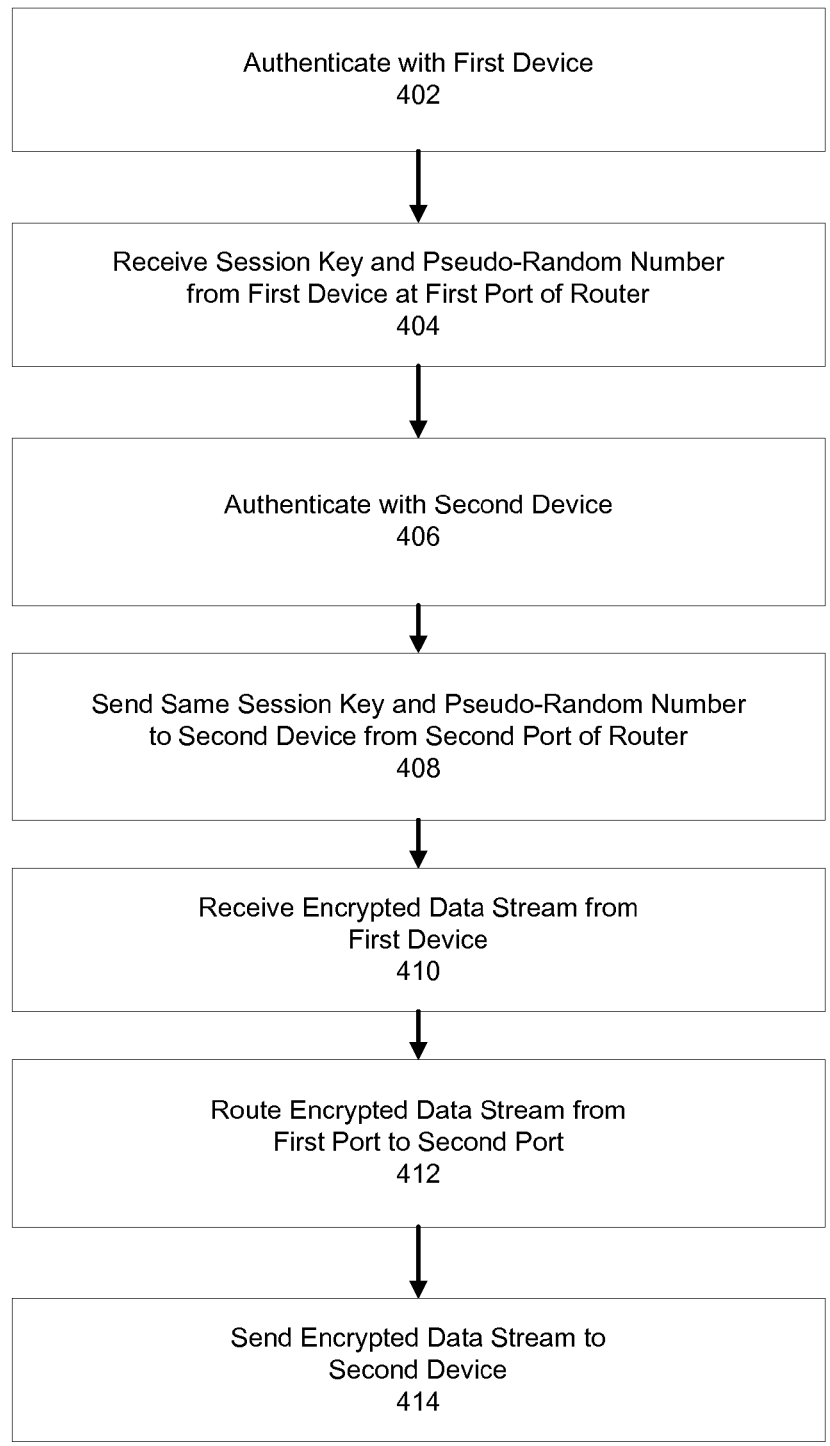
FIG. 4 is a flowchart of a method for routing encrypted data by a router from a source to a sink via a router without decryption and re-encryption in the router, according to one embodiment.

FIG. 4 is a flowchart illustrating a method for routing encrypted data by router 250 from a first device (e.g. source 110), to a second device (e.g. sink 180A), without decryption and re-encryption in router 250, according to one embodiment. Router 250 authenticates 402 with first device 110.

Router 250 receives 404 session key ks1 and pseudo-random number riv1 from first device 110 at first port 185 of router 250. Router 250 authenticates 406 with second device 180A. Router 250 sends 408 same session key ks1 and same pseudo-random number riv1 to second device 180A from second port 186 of router 250. Router 250 receives 410 an encrypted data stream 121 from first device 110 and routes 412 the encrypted data stream 231 from first port 185 to second port 186. Router 250 sends 414 the encrypted data stream 271 from second port 186 to second device 180A.

The sequence of steps as described above with reference to FIG. 4 is merely illustrative. For example, although receiving 410 of encrypted data stream is described above with reference to FIG. 4 as occurring after authenticating 406 with a second device, encrypted data stream may be received 410 before authenticating 406 with the second device.

Further, other operations may also be performed in addition to steps as described above with reference to FIG. 4. For example, router 250 may also authenticate with third device (e.g. sink 180B) at third port 187 following substantially the same method as described above with reference to FIG. 4. In this case, router 250 receives a second encrypted data stream 122 and routes the second encrypted data 122 from first port 185 to third port 187 and sends the encrypted stream from third port 187 to third device 180B. Further, router 250 may receive a multiplexed stream including first encrypted stream 121 and second encrypted stream 122. Router 250 demultiplexes the multiplexed stream into first encrypted stream 231 for routing to the second port 186 and the second encrypted stream 232 for routing to the third port 187.

Figure 5:
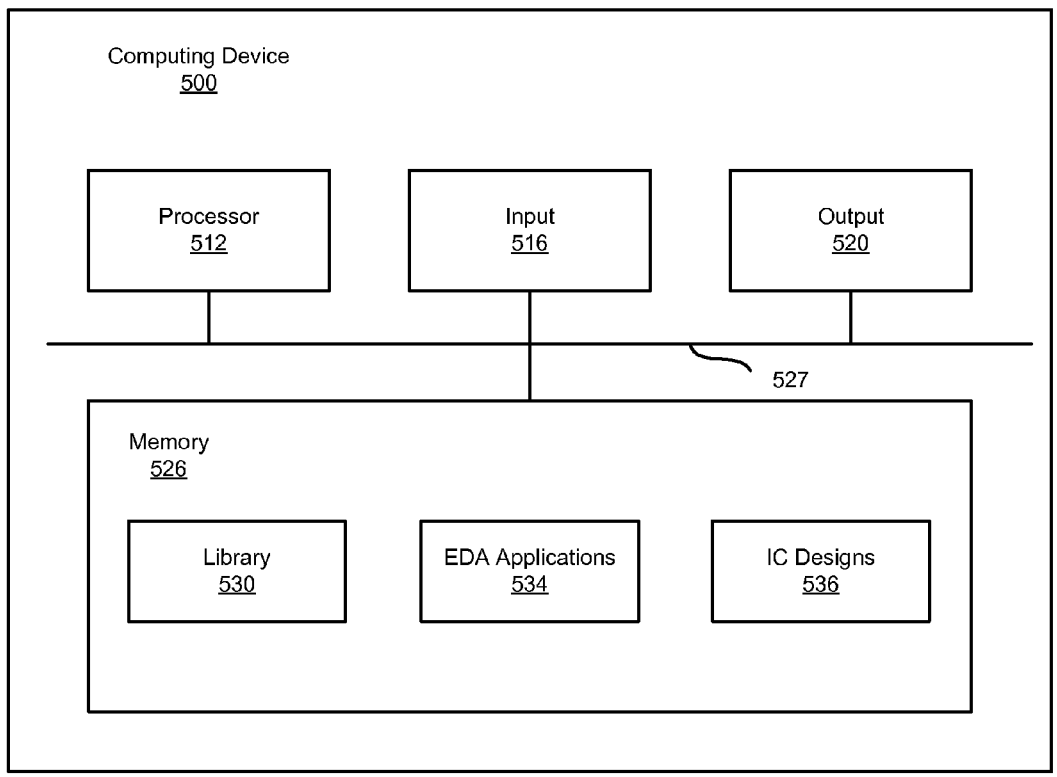
FIG. 5 is a block diagram of a computing device for performing designing operations associated with the router of FIG. 2, according to one embodiment.

FIG. 5 is a block diagram of a computing device 500 for performing designing operations associated with HDCP receiver (RX) engine 252 and HDCP transmitter (RX) engines 258A, 258B, according to one embodiment. The computer device 500 may include, among other components, a processor 512, an input module 516, an output module 520, a memory 526 and a bus 527 for connecting these components. The processor 512 executes instructions stored in the memory 526. The input module 516 may include various devices for receiving user input, including keyboards and pointing devices (e.g., mouse and touch screen). The output module 520 includes a display device or interface device for communicating with the display device.

The memory 526 is a non-transitory computer readable storage medium storing, among others, library 530, electronic design automation (EDA) applications 534 and integrated circuit (IC) designs 536. The library 530 may include data on various circuit components, including instances of HDCP receiver (RX) engine 252 and HDCP transmitter (RX) engines 258A, 258B describe herein. The EDA applications 534 may include various software programs for designing ICs, including place and route tools, synthesis tools, and verification tools. The design processed by the EDA applications 534 may be stored in IC designs 536. The IC designs 536 may be an entire operational circuit or a part of a larger IC circuit.

Principles described herein may be used in with protocols other than MHL and/or HDCP. For example, similar embodiments can also be used in HDCP in HDMI 2.0. Thus, while particular embodiments and applications of the present disclosure have been illustrated and described, it is to be understood that the embodiments are not limited to the precise construction and components disclosed herein and that various modifications.

What is claimed is:

1. A method for routing encrypted data, comprising:
   authenticating a router with a first device by an authentication protocol for performing a point-to-point authentication by communicating with the first device;
   receiving, at a first port of the router, a session key and a pseudo-random number for the session from the first device;
   authenticating a router with a second device by the authentication protocol by communicating from a second port of the router with the second device;
   sending the same session key and pseudo-random number for the session from the second port to the second device;
   receiving, at the first port, a first encrypted stream from the first device, the first encrypted stream encrypted using the session key and the pseudo-random number;
   routing the first encrypted stream from the first port to the second port without encrypting or decrypting the first encrypted stream; and
   sending the first encrypted stream from the second port to the second device.

2. The method of claim 1, further comprising:
   receiving, at the first port, a second encrypted stream from the first device, the second encrypted stream encrypted by using the session key and the pseudo random number;
   routing the second encrypted stream from the first port to a third port of the router; and
   sending the second encrypted stream from the third port to a third device.

3. The method of claim 2, further comprising demultiplexing a multiplexed stream including the first and second encrypted streams into the first encrypted stream for routing to the second port and the second encrypted stream for routing to the third port.

4. The method of claim 1, wherein the authentication protocol comprises high-bandwidth digital protection (HDCP) 2.2.

5. The method of claim 4, wherein the authentication with the first device comprises:
   receiving an authentication initiation message from the first device, the authentication initiation message containing a first pseudo-random value and transmitter capability parameters;
   sending an acknowledgment send certificate message to the first device, the acknowledgment send certificate message containing a receiver certificate, a second pseudo-random number, and receiver capability parameters;
   receiving, from the first device, a store acknowledgement that no master key is stored, the store acknowledgment containing a master key encrypted with a receiver public key;
   computing a verification value based at least on the first pseudo-random value, the receiver capabilities parameters, the transmitter capabilities parameters and a derived key;
   sending a verification value acknowledgement message to the first device; and
   sending pairing information to the first device, the pairing information generated by encrypting the master key with an internal secret key.

6. The method of claim 1, wherein the first encrypted stream, the session key and the pseudo-random number are transmitted over a wired communication network.

7. The method of claim 6, wherein the communication session is performed using High-Definition Multimedia Interface (HDMI) or Mobile High-Definition Link (MHL) protocol.

8. A router for routing encrypted data, comprising:
   a receiver circuit connected to a first port, the receiver circuit configured to:
      authenticate with a first device via the first port by an authentication protocol for performing a point-to-point authentication,
      receive a session key and pseudo-random number for the session from the first device, and
      receive, a first encrypted stream from the first device at the first port, the first encrypted stream encrypted using the session key and the pseudo-random number via the first port;
   a first transmitter circuit connected to a second port, the first transmitter circuit configured to:
      authenticate with a second device using the authentication protocol via the second port,
      send the same session key and pseudo-random number for the session to the second device via the second port, and
      send the first encrypted stream to the second device via the second port; and
   a link between the receiver circuit and the first transmitter circuit to route the first encrypted stream from the receiver circuit to the first transmitter circuit.

9. The router of claim 8, further comprising a second transmitter circuit configured to:
   authenticate with a third device via a third port of the router using the authentication protocol,
   send the same session key and pseudo-random number for the session to the third device via the third port, and
   send a second encrypted stream received from the first device via the first port to a third device via the third port.

10. The router of claim 9, wherein the receiver circuit is further configured to demultiplex a multiplexed stream including the first and second encrypted streams into the first encrypted stream for routing to the first transmitter circuit and the second encrypted stream for routing to the second transmitter circuit.

11. The router of claim 8, wherein the authentication protocol comprises high-bandwidth digital protection (HDCP).

12. The router of claim 11, wherein the receiver circuit is further configured to:
   receive an authentication initiation message from the first device, the authentication initiation message containing a first pseudo-random value and transmitter capability parameters,
   send an acknowledgment send certificate message to the first device, the acknowledgment send certificate message containing a receiver certificate, a second pseudo-random number, and receiver capability parameters,
   receive a store acknowledgement that no master key is stored from the first device, the store acknowledgment containing a master key encrypted with a receiver public key,
   compute a verification value based at least on the first pseudo-random value, the receiver capabilities parameters, the transmitter capabilities parameters and a derived key, send a verification value acknowledgement message to the first device, and send pairing information to the first device, the pairing information generated by encrypting the master key with an internal secret key.

13. The router of claim 8, wherein the first encrypted stream, the session key and the pseudo-random number are transmitted over a wired communication network.

14. The router of claim 8, wherein the communication session is performed using High-Definition Multimedia Interface (HDMI) or Mobile High-Definition Link (MHL) protocol.

15. A non-transitory computer-readable storage medium storing digital representation of a router, the router comprising a receiver circuit connected to a first port, the receiver circuit configured to:
authenticate with a first device via the first port by an authentication protocol for performing a point-to-point authentication,
receive a session key and pseudo-random number for the session from the first device, and
receive, a first encrypted stream from the first device at the first port, the first encrypted stream encrypted using the session key and the pseudo-random number via the first port;

a first transmitter circuit connected to a second port, the first transmitter circuit configured to:
authenticate with the second device using the authentication protocol,
send the same session key and pseudo-random number for the session to the second device via the second port, and
send the first encrypted stream to the second device via the second port; and a link between the receiver circuit and the first transmitter circuit to route the first encrypted stream from the receiver circuit to the first transmitter circuit.

16. The non-transitory computer readable storage medium of claim 15, the router further comprising a second transmitter circuit configured to:
authenticate with a third device via a third port of the router using the authentication protocol, and
send the same session key and pseudo-random number for the session to the third device via the third port, and
send a second encrypted stream received from the first device via the first port to a third device via the third port.

17. The non-transitory computer readable storage medium of claim 16, wherein the receiver circuit is further configured to demultiplex a multiplexed stream including the first and second encrypted streams into the first encrypted stream for routing to the first transmitter circuit and the second encrypted stream for routing to the second transmitter circuit.

18. The non-transitory computer readable storage medium of claim 15, wherein the authentication protocol comprises high-bandwidth digital protection (HDCP).

19. The non-transitory computer readable storage medium of claim 18, wherein the receiver circuit is further configured to:
receive an authentication initiation message from the first device, the authentication initiation message containing a first pseudo-random value and transmitter capability parameters;
send an acknowledgment send certificate message to the first device, the acknowledgment send certificate message containing a receiver certificate, a second pseudo-random number, and receiver capability parameters;
receive a store acknowledgement that no master key is stored from the first device, the store acknowledgment containing a master key encrypted with a receiver public key;
compute a verification value based at least on the first pseudo-random value, the receiver capabilities parameters, the transmitter capabilities parameters and a derived key;
send a verification value acknowledgement message to the first device; and
send pairing information to the first device, the pairing information generated by encrypting the master key with an internal secret key.

20. The non-transitory computer readable storage medium of claim 15, wherein the first encrypted stream, the session key and the pseudo-random number are transmitted over a wired communication network.

* * * * *